May 17, 1955 P. W. GARNES 2,708,585
COMBINATION CARRIAGE-CRADLE
Filed Dec. 13, 1951
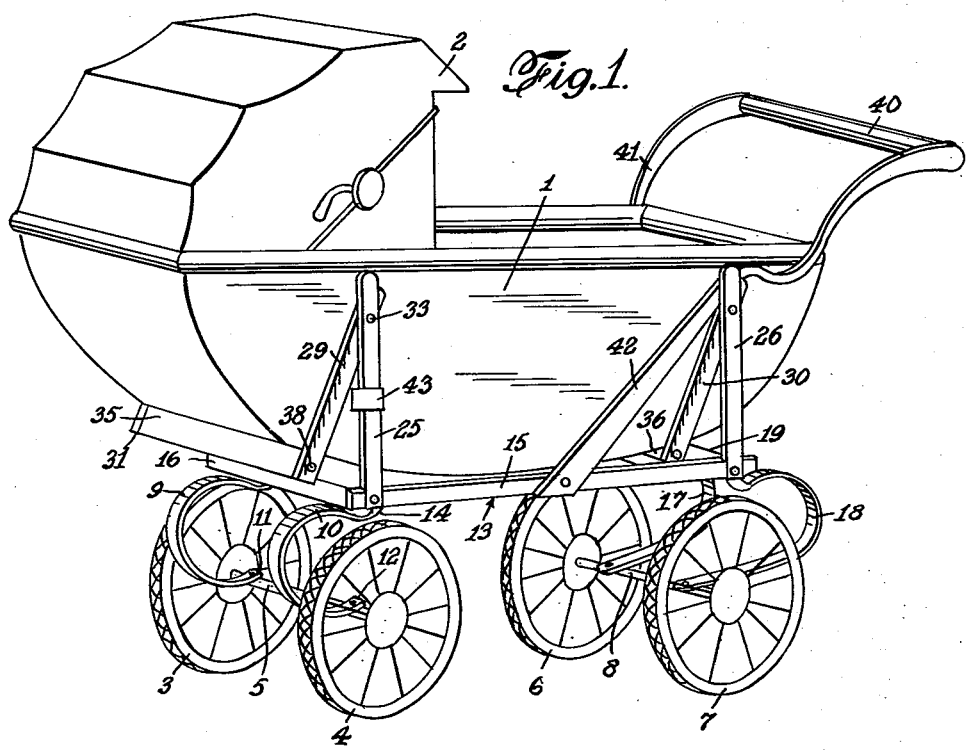
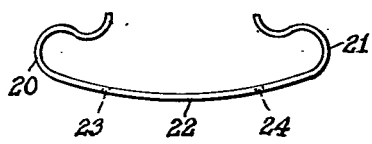
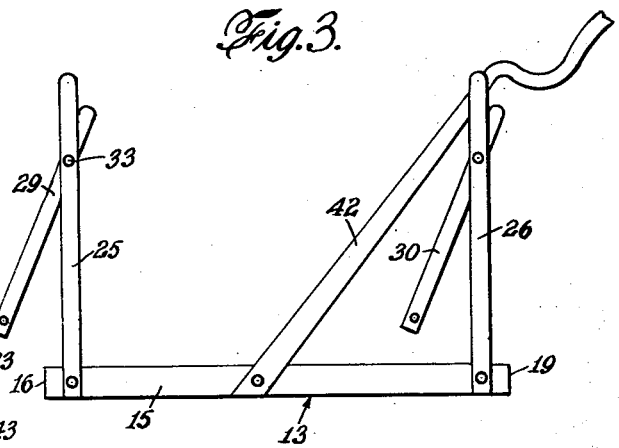
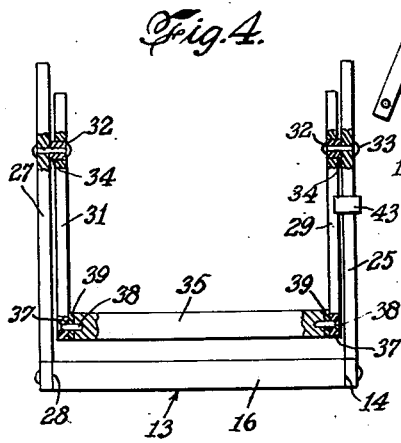
INVENTOR.
PETTUS W. GARNES
BY
ATTORNEY.

United States Patent Office 2,708,585
Patented May 17, 1955

2,708,585
COMBINATION CARRIAGE-CRADLE
Pettus W. Garnes, Bloomfield, N. J.
Application December 13, 1951, Serial No. 261,492
2 Claims. (Cl. 280—47.41)

The present invention deals with a combination carriage-cradle and more particularly with a combination carriage-cradle adapted to provide improved swinging motion to the cradle component of the combination.

Infant carriages and cradles per se are well known in the art. Carriages are primarily adapted for vehicular conveyance of the infant, while cradles are adapted to provide either a mechanical or hand operated rocking motion for sleep inducement. Very often carriages are rolled back and forth and rocked in order to provide a motion for sleep inducement.

However, the rocking motion is extremely limited since carriage construction components are not generally adapted for such motion and the infant is not provided with a substantially smooth rocking movement. Moreover, the back and forth motion of the carriage necessitates substantial space for the rolling of the carriage wheels in addition to substantial effort on the part of the person providing the rolling movement.

It is an object of the present invention to provide a combination carriage-cradle which functions as either carriage or cradle. It is another object of the present invention to provide a carriage-cradle combination which functions simultaneously as carriage and cradle. It is a further object of the present invention to provide a carriage-cradle combination whereby certain carriage components operate to provide an improved swinging motion to the cradle. Other objects and advantages will become apparent from the description hereinafter following and the drawings forming part hereof, in which Fig. 1 illustrates a perspective view of a complete carriage-cradle combination, Fig. 2 illustrates a side view of a modification of the present invention, and Figs. 3 and 4 illustrate a side view and a front view, respectively, of cradle mounting means.

According to the present invention I provide a carriage-cradle combination comprising a cradle member adapted to contain an occupant, e. g. an infant, and which is swingably mounted above a carriage chassis whereby the said combination operates not only as a carriage and cradle simultaneously or as a carriage or cradle separately, but also renders the cradle component capable of improved cradle motion by virtue of certain carriage embodiments functioning in combination with the swingably mounted cradle member.

Fig. 1 illustrates the complete carriage-cradle combination and comprises a cradle member 1 for containing an occupant and which may be provided with a canopy 2 as shown. The cradle member is mounted on a carriage chassis comprising front wheels 3 and 4 mounted on front axle 5 and rear wheels 6 and 7 mounted on a rear axle 8, said axles being parallel to each other and secured to spring members of the bow-shaped or C-shaped type. The spring members may consist of a pair of individual C-shaped springs 9 and 10 each having a lower terminal thereof, e. g. terminals 11 and 12, anchored to the front axle 5 and spaced laterally of each other on said axle so that one of said lower terminals is positioned near one of the wheels 3 and 4 and the other lower terminal near the other wheel. The upper terminals of each spring are each secured to an opposite side of a rectangular horizontal platform or frame 13, e. g. a terminal 14 of spring 10 is secured to a lengthwise side 15 of the frame 13. The springs 9 and 10 are so mounted between the said axle 5 and platform 13 that the springs face toward the rear axle 8 while the curved portion of each spring is positioned outwardly of an end 16 of the platform 13. Similar springs 17 and 18 are similarly mounted between rear axle 8 and the frame 13 and face the front axle 5 with the curved portions thereof being positioned outwardly of the end 19 of platform 13.

Although I may use four individual springs as described above, I prefer to use only a pair of bow-shaped springs one of which is illustrated by Fig. 2, whereby the bow-shaped spring comprises opposite end portions 20 and 21 which curve inwardly of each other and upwardly to form substantially C-shaped spring members corresponding to and positioned similarly as the individual C-shaped spring members described with respect to Fig. 1. The bow-shaped portion 22 of each of such springs is provided with axle anchoring means 23 and 24 each of which anchor a front or rear axle while the said bow-shaped portion acts as a substantially resilient cross-bar between the front and rear wheels.

Having described the particular carriage chassis as a part of my carriage-cradle combiantion, I now provide rigid upright members secured to opposite longitudinal sides of the platform 13, e. g. upright members 25 and 26 secured to the side 14 of platform 13 as illustrated by Figs. 3 and 4. Similar upright members, e. g. upright 27 are secured to the opposite side 28 of the platform as particularly illustrated by Fig. 4. To an upper portion of said uprights and on an inner side thereof there are mounted swing arms, e. g. swing arms 29 and 30, the upper portions of which are mounted on uprights 25 and 26 respectively. Similar swing arms, e. g. swing arm 31, are similarly mounted on the uprights secured to the side 28 of the platform. In order to swingably mount the swing arms to the uprights, e. g. swing arm 29 to upright 25 and the opposite swing arm 31 to upright 27, I provide the upper portions of each swing arm with an aperture containing a tubular bearing 32 through which a retaining means, e. g. a bolt member 33, is mounted in such manner that it passes through an upper portion of the upright as well as through the bearing 32 in the upper portion of each swing arm and through a washer or spacer 34 between the uprights and swing arms so that the swing arms are freely movable with an arc-like movement or with a free swing movement due to the spacing thereby maintained between the swing arms and uprights by means of spacers 34. At least the opposite pairs of front swing arms and rear swing arms are each provided with a rotatably mounted cross-bar 35 and 36, respectively, at the lower portions thereof and are rendered rotatable by means of tubular bearings 37 and retaining means 38 with a spacer 39 between the said cross-bar and each of the swing arms so that a substantially U-shaped cradle support is provided at the front and rear of the carriage. It is apparent that the cradle 1 rests on or is otherwise secured to the said cross-bars 35 and 36 and the cradle is capable of a front and rearward swinging motion when supported on said cross-bars.

When the above described combination is used as a carriage for transport and moved by means of the push bar 40, which is connected directly to the platform 13 by braces 41 and 42, the swing arms are locked against swing motion by means of, for example, the diagrammatically illustrated locking means 43 positioned on an upright and engageable and disengageable with a swing arm. It is apparent that a locking means can also cooperate between a cross-bar 35 or 36 and the platform 13; or otherwise, to lock the cradle member 1 against swing motion.

However, when freely swingable, the cradle is operated by hand and rocked forwardly and rearwardly lengthwise of the platform 13. Since the platform 13 is mounted on C-shaped springs or bow-shaped springs as above described, the momentum of the forward and rearward motion of the cradle provides an impetus to the front and rear springs which act alternately to push and pull the platform 13 thereby providing an increased number of alternate forward and rearward movements to the cradle without hand operation than possible without such combination. Therefore, a minimum of effort is necessary on the part of the person operating the cradle in order to keep the cradle swinging. Moreover, the combination according to this invention provides a smoother sweeping swing than provided by ordinary cradles and the said forward and rearward motion simulates the rocking of the infant by the arms of a person holding the infant since the cradle provides a similar head to foot rocking motion.

What I claim is:

1. A carriage-cradle combination comprising a carriage chassis having a rectangular platform member and front and rear pairs of wheels, an axle connecting each pair of wheels, said platform being supported by a plurality of substantially C-shaped front and rear spring members having lower portions thereof anchored to said axles and upper portions secured to said platform, said C-shaped spring members being secured to said front axle to face said rear axle and said C-shaped spring members being secured to said rear axle to face said front axle, front and rear upright members secured substantially at the corners of said platform, a cradle member swingably supported above said platform between said uprights by means of front and rear pairs of swing arms rotatably connected to an upper portion of said upright members, whereby said cradle is operative with a front to rear swing movement under the influence of said spring members.

2. A carriage-cradle combination according to claim 1, whereby the said C-shaped spring members are the end portions of a pair of parallel bow-shaped springs connecting the said front and rear pairs of wheels.

References Cited in the file of this patent

UNITED STATES PATENTS

| | | |
|---|---|---|
| 143,818 | Galt | Oct. 21, 1873 |
| 381,834 | Gibson | Apr. 24, 1888 |
| 422,407 | Harris | Mar. 4, 1890 |
| 472,314 | Schlich | Apr. 5, 1892 |
| 622,158 | Mahar | Mar. 28, 1899 |
| 1,372,588 | Bak | Mar. 22, 1921 |
| 1,439,008 | Lincoln | Dec. 19, 1922 |
| 2,107,940 | Hedstrom | Feb. 8, 1938 |
| 2,616,485 | Robbins | Nov. 4, 1952 |